United States Patent
Ding et al.

(10) Patent No.: US 10,776,725 B2
(45) Date of Patent: Sep. 15, 2020

(54) GRAPHICAL MODELING TOOL

(75) Inventors: Li Ding, Markham (CA); Diana H. Lau, Markham (CA); Elena H. Litani, Markham (CA); Joanna W. Ng, Markham (CA); Leho Nigul, Markham (CA)

(73) Assignee: International Business Machines Corporation, Armonk, NY (US)

( * ) Notice: Subject to any disclaimer, the term of this patent is extended or adjusted under 35 U.S.C. 154(b) by 534 days.

(21) Appl. No.: 12/815,375

(22) Filed: Jun. 14, 2010

(65) Prior Publication Data

US 2010/0325605 A1 Dec. 23, 2010

(30) Foreign Application Priority Data

Jun. 18, 2009 (CA) .................................. 2669603

(51) Int. Cl.
*G06F 9/44* (2018.01)
*G06Q 10/04* (2012.01)
*G06Q 10/10* (2012.01)

(52) U.S. Cl.
CPC ............. *G06Q 10/04* (2013.01); *G06Q 10/10* (2013.01)

(58) Field of Classification Search
CPC combination set(s) only.
See application file for complete search history.

(56) References Cited

U.S. PATENT DOCUMENTS

| | | | |
|---|---|---|---|
| 6,983,421 B1 | 1/2006 | Lahti | |
| 2003/0154191 A1 | 8/2003 | Fish | |
| 2004/0056896 A1 | 3/2004 | Doblmayr | |
| 2004/0078373 A1* | 4/2004 | Ghoneimy et al. | ............. 707/10 |
| 2005/0060129 A1* | 3/2005 | Mosterman | ............... G06F 8/34 |
| | | | 703/2 |
| 2005/0256882 A1* | 11/2005 | Able | ....................... G06F 16/95 |
| 2006/0074731 A1* | 4/2006 | Green et al. | ..................... 705/8 |
| 2006/0150169 A1* | 7/2006 | Cook | ........................ G06F 8/10 |
| | | | 717/156 |
| 2007/0157096 A1* | 7/2007 | Keren | ...................... G06F 8/34 |
| | | | 715/760 |
| 2007/0168479 A1* | 7/2007 | Bean | ...................... H04L 67/16 |
| | | | 709/223 |
| 2008/0010597 A1 | 1/2008 | Seemann | |
| 2009/0006987 A1* | 1/2009 | Simhi | ...................... G06F 8/24 |
| | | | 715/762 |

(Continued)

*Primary Examiner* — Chat C Do
*Assistant Examiner* — Lenin Paulino
(74) *Attorney, Agent, or Firm* — Christopher M. Pignato (57) ABSTRACT

A method for implementing a graphical modeling tool in a web-based environment is disclosed herein. In one embodiment, such a method may include enabling a user to import, into a web-based environment, a domain meta model comprising a number of meta model elements. The method may further enable the user to associate the meta model elements with graphical representations in the web-based environment, thereby allowing the user to create palette elements. The user may then assemble the palette elements on a canvas to create a diagram. This diagram may be converted into an instance of the domain meta model. This instance may be validated for conformance with the rules and constraints associated with the domain meta model. A corresponding apparatus and computer program product are also disclosed and claimed herein.

14 Claims, 10 Drawing Sheets

(56) References Cited

U.S. PATENT DOCUMENTS

| | | | |
|---|---|---|---|
| 2009/0007062 A1* | 1/2009 | Gilboa | G06Q 10/06 717/105 |
| 2009/0150859 A1* | 6/2009 | Cummings | G06F 8/34 717/104 |

* cited by examiner

GRAPHICAL MODELING TOOL

CROSS-REFERENCE TO RELATED APPLICATIONS

This application claims priority under 35 U.S.C. § 119(a) to Canadian Patent Application Serial Number 2669603, filed Jun. 18, 2009, entitled "GRAPHICAL MODELING TOOL", the entirety of which is incorporated herein by reference.

FIELD OF THE INVENTION

This invention relates to graphical modeling tools, and more particularly to web-based graphical modeling tools that use a declarative approach to modeling and require little or no imperative programming.

BACKGROUND OF THE INVENTION

A modeling language is an artificial language used to express information, knowledge, or systems in a structure that is defined by a consistent set of rules. The rules may be used to interpret the meaning of components in the structure. A modeling language can be graphical or textual. A graphical modeling language typically uses diagrams with named symbols that represent concepts, lines that connect the symbols and represent relationships, and other graphical annotations to represent constraints. A textual modeling language, on the other hand, typically uses standardized keywords accompanied by parameters to make computer-interpretable expressions.

One example of a graphical modeling language is Business Process Modeling Notation (BPMN). BPMN is a standard for modeling business processes and provides a graphical notation for specifying the business processes. Other examples of modeling languages include the Unified Modeling Language (UML) and the Web Ontology Language (OWL). UML is a standardized general-purpose modeling language in the field of software engineering that includes a set of graphical notation techniques to create abstract models of specific systems. OWL is a family of knowledge representation languages for authoring ontologies.

Currently, various graphical modeling tools (such as the Eclipse Graphical Modeling Framework (GMF)) provide functionality to perform graphical modeling based on various domain models, such as the domain models listed above (i.e., BPMN, UML, OWL, etc). Although graphical modeling tools such as GMF are open and extensible, such tools are generally only operable in desktop environments. Consequently, the graphical modeling tool instance resides in the user's computer and is only operable by the user, significantly limiting its flexibility. Furthermore, extending and customizing a tool like GMF to support changed or new models generally requires imperative programming, making such tools difficult to use. This makes tools such as GMF particularly unsuitable for non-technical users.

In view of the foregoing, what is needed is a web-based graphical modeling tool that is open and extensible in supporting new or changed domain models. Further needed is a web-based graphical modeling tool that can support new or changed domain models without the need for imperative programming. Yet further needed is a web-based graphical modeling tool which provides functionality for both diagramming and validating instances of domain models.

SUMMARY OF THE INVENTION

The invention has been developed in response to the present state of the art and, in particular, in response to the problems and needs in the art that have not yet been fully solved by currently available apparatus and methods. Accordingly, the invention has been developed to provide apparatus and methods for implementing a declarative graphical modeling tool in a web-based, multi-user environment. The features and advantages of the invention will become more fully apparent from the following description and appended claims, or may be learned by practice of the invention as set forth hereinafter.

Consistent with the foregoing, a method for implementing a declarative graphical modeling tool in a web-based environment is disclosed herein. In one embodiment, such a method may include enabling a user to import, into a web-based environment, a domain meta model comprising a number of meta model elements. The method may further enable the user to associate the meta model elements with graphical representations in the web-based environment, thereby allowing the user to create palette elements. In certain embodiments, collections of palette elements may be combined together, thereby allowing the user to create palettes containing multiple palette elements. In certain embodiments, palette elements from multiple domain meta models may be collected into one palette. The user may then assemble the palette element instances on a canvas to create a diagram. In certain embodiments, the position and composition of the palette element instances within the diagram may be validated through model-view-control mechanisms of the palette element. Once the diagram is created, the diagram may be converted into an instance of the domain meta model. This instance may be validated for conformance with the rules and constraints associated with the domain meta model. In certain embodiments, all of the above-mentioned tasks may be performed with little or no imperative programming from the user. Similarly, in certain embodiments, all of the modeling artifacts (i.e., the palettes and palette elements) may be shared with access control and referenced by URLs.

A corresponding apparatus and computer program product are also disclosed and claimed herein.

DETAILED DESCRIPTION OF THE DRAWINGS

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

As will be appreciated by one skilled in the art, the present invention may be embodied as an apparatus, system, process, or computer program product. Furthermore, the present invention may take the form of a hardware embodiment, a software embodiment (including firmware, resident software, micro-code, etc.) configured to operate hardware, or an embodiment combining software and hardware aspects that may all generally be referred to herein as a "module" or "system." Furthermore, the present invention may take the form of a computer program product embodied in any tangible medium of expression having computer-usable program code stored in the medium.

Any combination of one or more non-transitory computer-usable or computer-readable medium(s) may be utilized. The non-transitory computer-usable or computer-readable medium may be, for example but not limited to, an electronic, magnetic, optical, electromagnetic, semiconductor system, apparatus, or device. More specific examples (a non-exhaustive list) of the non-transitory computer-readable medium may include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device. In the context of this document, a non-transitory computer-usable or computer-readable medium may be any medium that can contain, or store the program for use by or in connection with the instruction execution system, apparatus, or device.

Computer program code for carrying out operations of the present invention may be written in any combination of one or more programming languages, including an object-oriented programming language such as Java, Smalltalk, C++, or the like, and conventional procedural programming languages, such as the "C" programming language or similar programming languages. The program code may execute entirely on a user's computer, partly on a user's computer, as a stand-alone software package, partly on a user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of processes, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Figure 1:
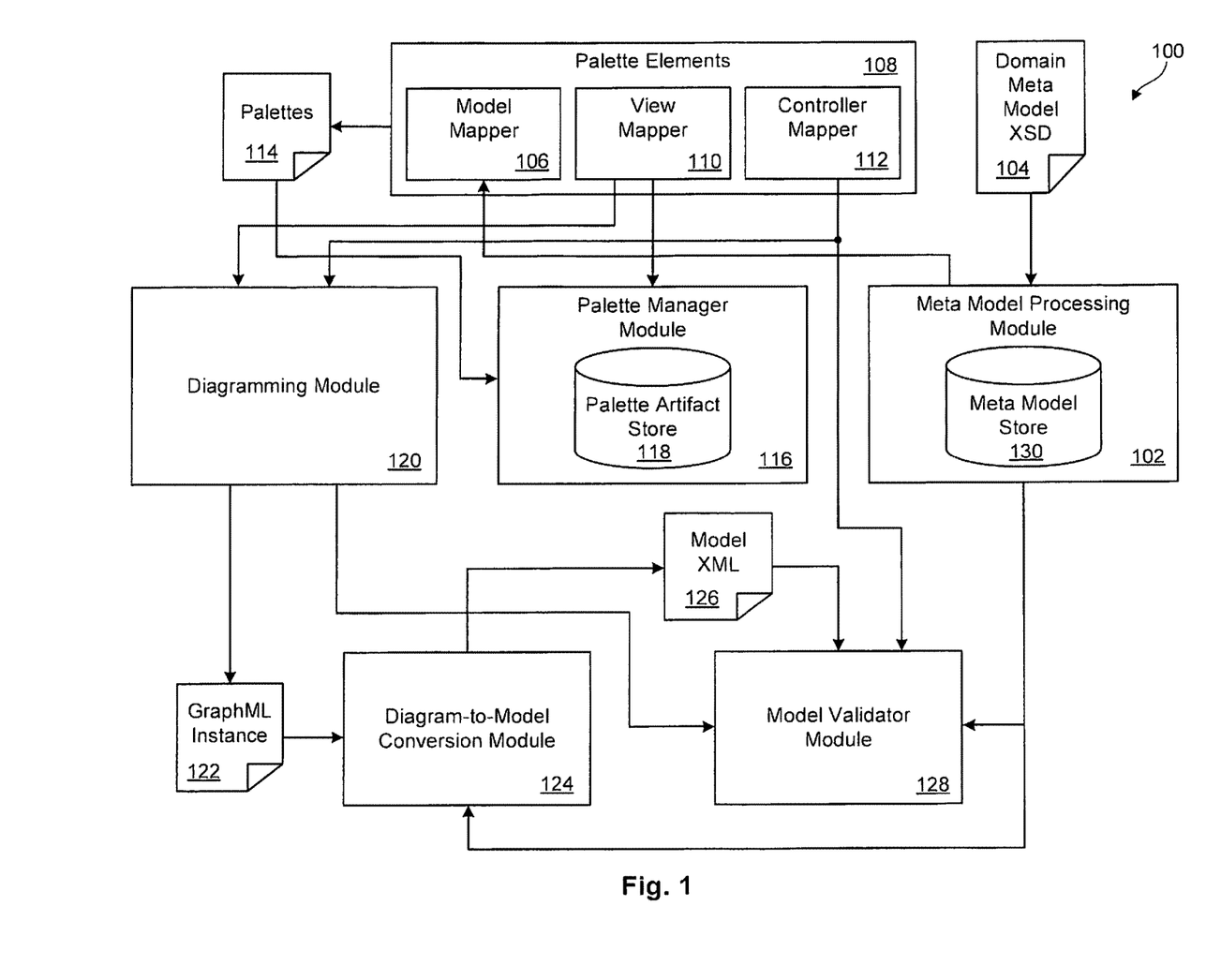
FIG. 1 is a high-level block diagram showing an architectural overview of a web-based graphical modeling tool in accordance with the invention.

Referring to FIG. 1, an architectural overview of one embodiment of a framework for implementing a web-based modeling tool in accordance with the invention is illustrated. This framework has an open architecture and may be used to create models based on modeling domains, such as BPMN, UML, and OWL, to name just a few. FIGS. 2 through 10 provide one non-limiting example of a graphical user interface for a web-based modeling tool (using a very small subset of the BPMN domain model) that uses the architecture 100. This very simple BPMN implementation is only an example and is not intended to be limiting.

As shown, the architecture 100 includes a meta model processing module 102 configured to receive a meta model 104 in a desired format. For example, the meta model processing module 102 may receive a meta model 104 in the form of an XSD document 104 or other suitable representation. The meta model processing module 102 may, in certain embodiments, store the meta model 104 in a meta model store 130. In certain embodiments, the meta model processing module 102 may transform this meta model 104 into a model tree. A user may select domain model elements from this model tree. A model mapper 106 may capture and associate this domain model element with a palette element 108. In selected embodiments, the domain model element may be captured declaratively (e.g., by designating a name space and XPath reference(s) of a domain model 104).

Once the domain model element is captured, a view mapper 110 may declaratively associate the domain model element with a graphical representation (e.g., an icon, shape, digital image, etc.). In certain embodiments, the view mapper 110 may accept additional view property and transformation information via a graphical declarative language (e.g., CSS). Finally, each palette element 108 may include a controller mapper 112 to declaratively specify diagramming rules and domain rules that are associated with the palette element 108. These diagramming rules may, for example, designate how the palette element 108 may be used in a diagram (e.g., which palette elements the palette element may precede or follow). The domain rules may, for example, designate how to validate the domain model elements represented by the palette element 108. These are just some examples of rules and are not intended to be an exhaustive list. A model mapper 106, view mapper 110, and controller mapper 112 may be referred to as a model-view-controller mechanism for the palette elements 108.

Each of the palette elements 108 may be associated with one or more palettes 114. These palettes 114 and palette elements 108 may be used to create diagrams based on a particular domain model, as will be explained in more detail in the Figures to follow. In selected embodiments, the palette elements 108 and palettes 114 may be persisted as sharable server-side resources in a palette artifact store 118. As an example, the palette elements 108 and palettes 114 may be shared in the form of RESTful, URL-able resources. Sharing in this manner will allow multiple users to use the palettes 114 and palette elements 108 to create diagrams for a particular domain model without having to duplicate the work of others. In certain embodiments, a palette manager module 116 may be provided to load palette elements 108 onto palettes 114, load palettes 114, register palettes 114 or palette elements 108, or enable a user to search for palettes 114 or palette elements 108 stored on a server.

In certain embodiments, palette elements 108 may include one or more of the following properties: palette element name for identification; palette element tagging for semantic association and searching of palette elements 108; palette element access control information to enable the palette element 108 to be shared with other users. In certain embodiments, each palette element 108 includes a palette element meta model so that an instance of a palette element 108 may be created by declaring its content following palette template XML.

A diagramming module 120 may enable a user to select various palette elements 108 from the palettes 114 and connect them together to create a diagram. Each of these palette elements 108 maps to the domain model elements and graphical representation previously described. When creating the diagram, the graphical representations that map to each palette element 108 will be used in the diagram. In selected embodiments, the diagramming module 120 may generate a GraphML document 122 (an XML-based file for representing graphs) or other suitable document or file for represent a diagram.

Using the GraphML document 122 and the mapping information between palette elements 108 and domain model elements, a diagram-to-model conversion module 124 may convert the graphical diagram 122 into a domain model instance 126. This domain model instance 126 may be described in XML or another suitable format. The domain model instance 126 may then be sent to a model validator module 128. The model validator module 128 may validate the model instance 126 against the original meta model (in the meta model store 130) to ensure that the model instance 126 complies with the rules and constraints set forth by the meta model 104. This will ensure that a domain model instance 126 complies with the domain model rules and constraints prior to runtime.

In selected embodiments, the model validator module 128 validates the entire model instance 126 as a unit after it has been created. This may be referred to as "static validation." In other embodiments, the model validator module 128 validates each palette element 108 as it is added to the diagram (using the rules and constraints designated by the controller mapper 112 associated with the palette element 108). This will ensure that the palette element 108 complies with the diagramming rules and constraints of the meta model 104. This process may be called "dynamic validation."

Figure 2:
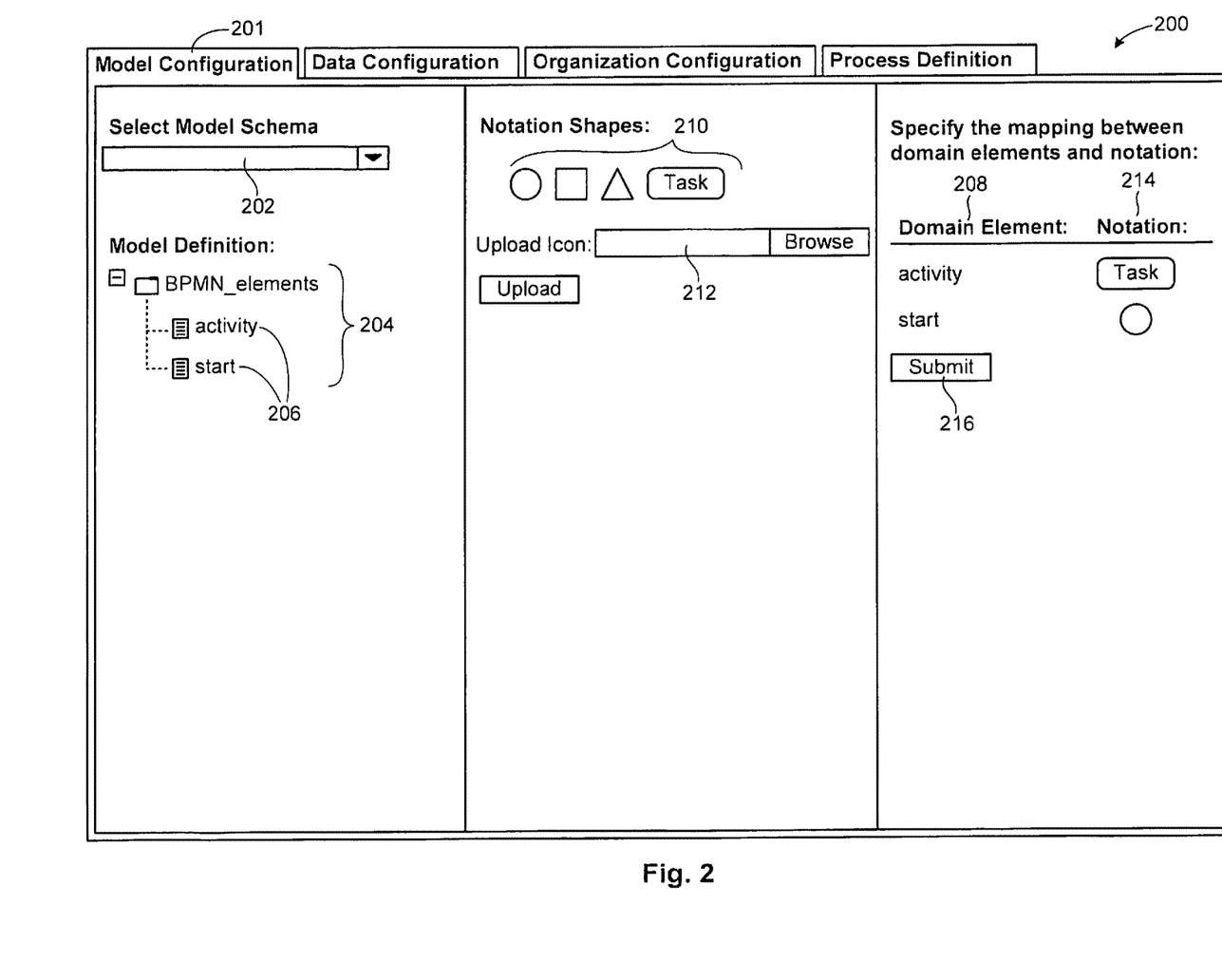
FIG. 2 is an example of a graphical user interface for creating palette elements and palettes, in this example a "model configuration" window for creating domain model palette elements.

As previously mentioned, FIGS. 2 though 10 provide one example of a web-based graphical user interface for implementing the architecture 100 illustrated in FIG. 1. This web-based user interface shows one example of functionality that could be accessed through a browser with the right URL and user account, without the need to install software on the user's desktop computer. As mentioned, this user interface is only an example and is not intended to be limiting. Indeed, a wide variety of different GUIs are possible and within the scope of the present invention.

Referring to FIG. 2, in selected embodiments, a web-based user interface 200 may, in certain embodiments, provide a "model configuration" tab 201 and associated window to create various palette elements 108 associated with domain model elements. This model configuration window 201 may, in certain embodiments, allow a user to select a domain model schema (using some GUI widget 202 such as a dialog box, etc.) that he or she wants to model. This schema may be transformed into a model tree 204, which may be presented to the user and enable the user to select meta model elements from the domain meta model. In this example, the model tree 204 shows an "activity" meta model element 206 and a "start" meta model element 206, each belonging to a small subset of a BPMN domain model schema. A user may select these elements 206 with a mouse or other selection device. In certain embodiments, the model elements 206 may appear in a list 208 of domain model elements once they have been selected.

The model configuration window 201 may also enable the user to associate a graphical representation with each model element 206. In certain embodiments, the model configuration window 201 may provide a list of graphical representations 210 from which the user may choose and/or provide a GUI widget 212 allowing the user to upload a graphical representation (e.g., an icon, digital image, etc.). Once the user selects a graphical representation 210 for a particular domain model element 206, the graphical representation 210 may appear next to the domain model element 206 in a list 214, thereby showing the mapping between the domain model element 206 and the graphical representation 210. Once the domain model elements 206 and associated graphical elements 210 have been selected, the user may select (e.g., click) a "submit" button 216 to create the desired palette elements 108.

Figure 3:
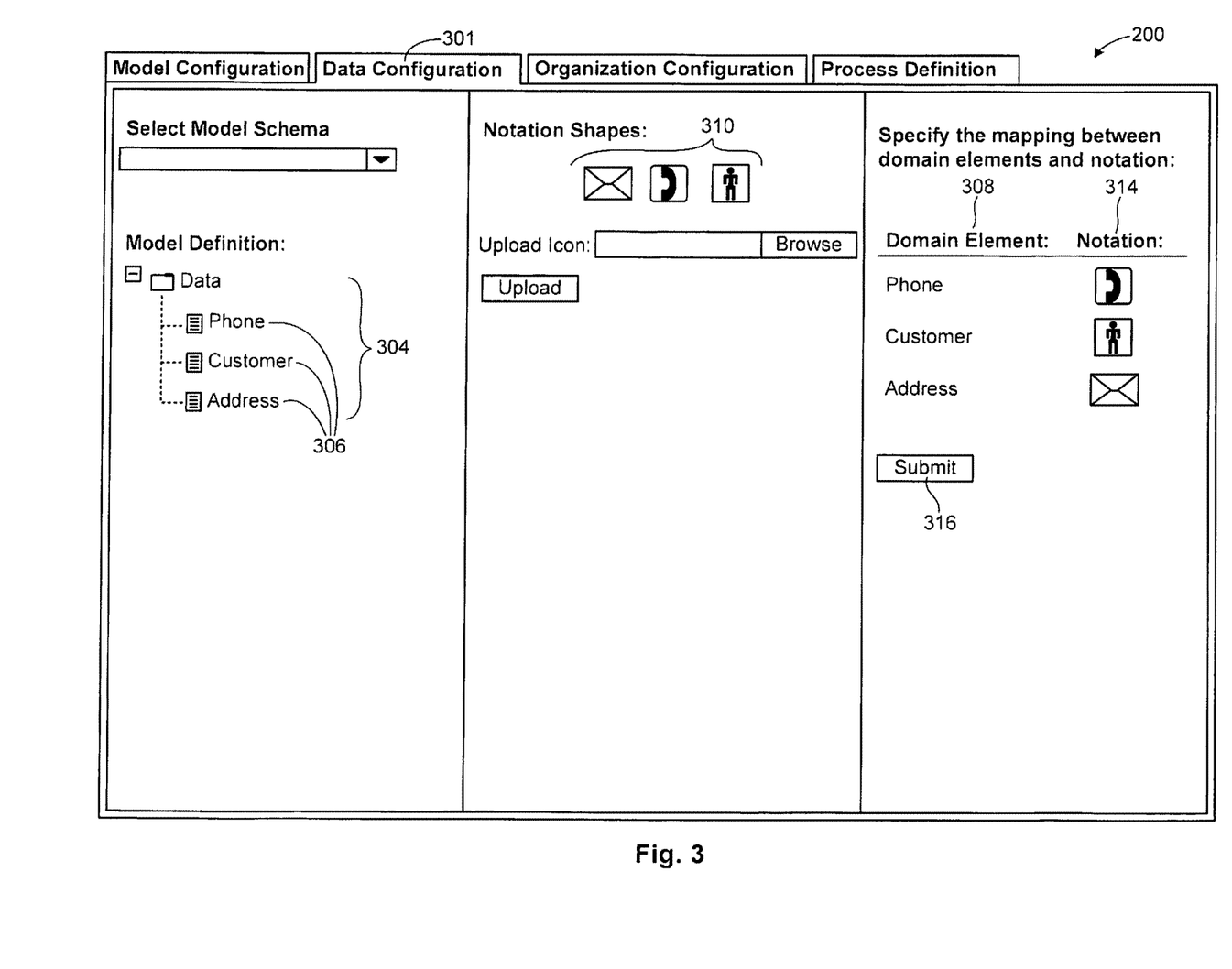
FIG. 3 is another example of a graphical user interface for creating palette elements and palettes, in this example a "data configuration" window for creating data palette elements.

Referring to FIG. 3, in selected embodiments, the web-based user interface 200 may also provide a "data configuration" tab 301 and associated window to generate palette elements 108 associated with data elements. This data configuration window 301 may also allow the user to import a model schema containing the desired data elements. Like the previous example, the schema may be transformed into a tree structure 304, which may allow the user to select data elements 306. In this example, the tree structure 304 includes a "phone" data element 306, a "customer" data element 306, and an "address" data element 306. A user may select these data elements 306 with a mouse or other selection device. These data elements 306 may appear in a list 308 of data elements once they have been selected.

Like the previous example, the data configuration window 301 may allow the user to associate a graphical representation 310 with each data element 306. The data configuration window 301 may provide a list of graphical representations 310 from which the user may select or allow the user to upload a graphical representation 310. Once the user selects a graphical representation 310 for a particular data element 306, the graphical representation 310 may appear next to the data element 306 in a list 314 to show the mapping. Once the data elements 306 and associated graphical elements 310 have been selected, the user may click a "submit" button 316 to create the desired data palette elements 108.

Figure 4:
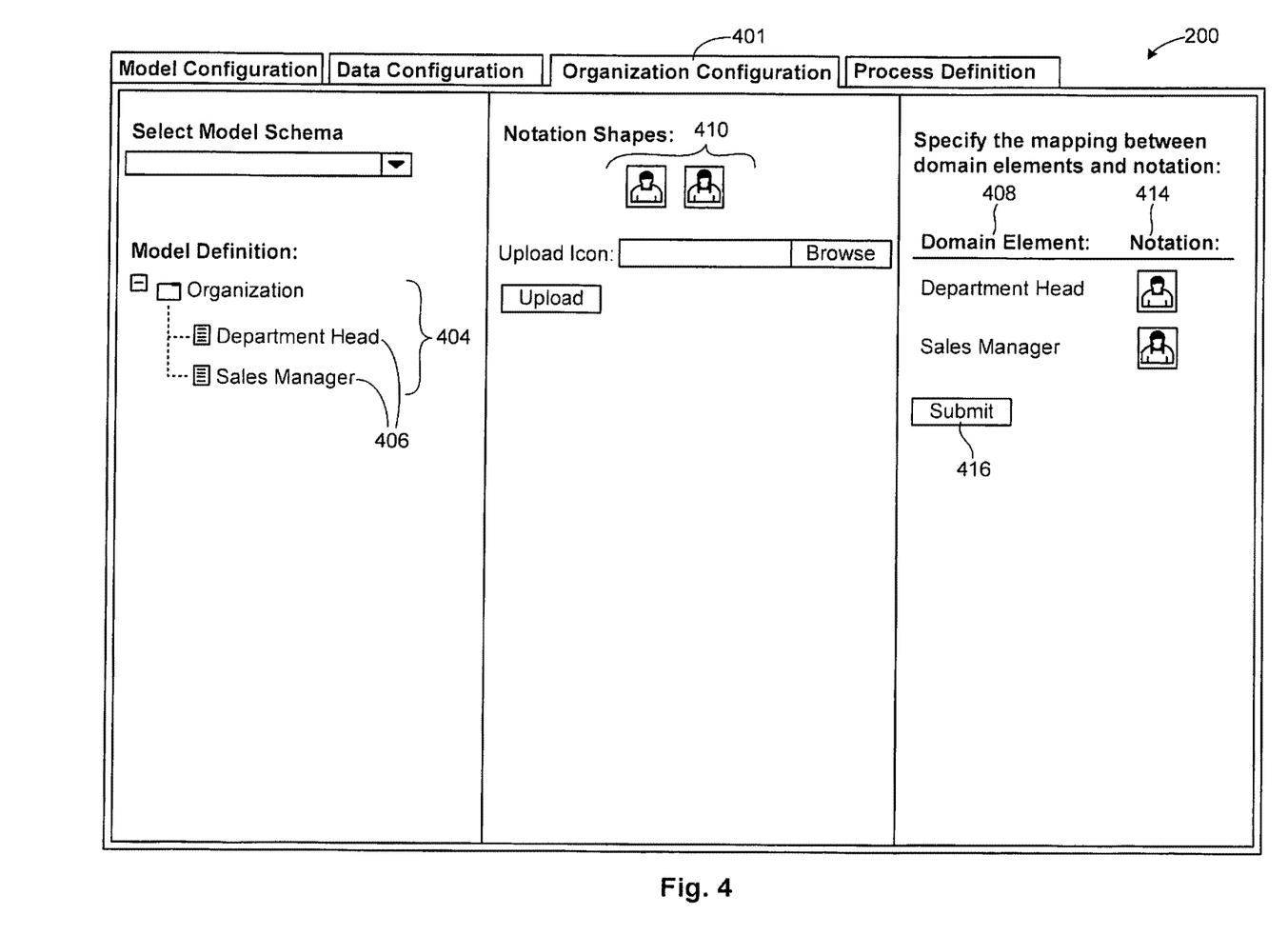
FIG. 4 is another example of a graphical user interface for creating palette elements and palettes, in this example an "organization configuration" window for creating organization palette elements.

Referring to FIG. 4, similarly, in selected embodiments, the web-based user interface 200 may also provide an "organization configuration" tab 401 and associated window to generate palette elements 108 associated with organizational elements. This organization configuration window 401 may allow the user to import a model schema containing the desired organization elements. Like the previous example, this schema may be transformed into a tree structure 404, which may allow the user to select organization elements 406 therefrom. In this example, the tree structure 404 shows a "department head" organization element 406 and a "sales manager" organization element 406. A user may select these organization elements 406 with a mouse or other selection device. Once selected, these organization elements 406 may appear in a list 408 of domain model elements.

Like the previous example, the organization configuration window 401 may allow the user to associate a graphical representation 410 with each organization element 406. The organization configuration window 401 may provide a list of graphical representations 410 from which the user may select or allow the user to upload a graphical representation 410. Once the user selects a graphical representation 410 for a particular organization element 406, the graphical representation 410 may appear next to the organization element 406 in a list 414. Once the organization elements 406 and associated graphical elements 410 have been selected, the user may click a "submit" button 416 to create the desired organization palette elements 108.

Figure 5:
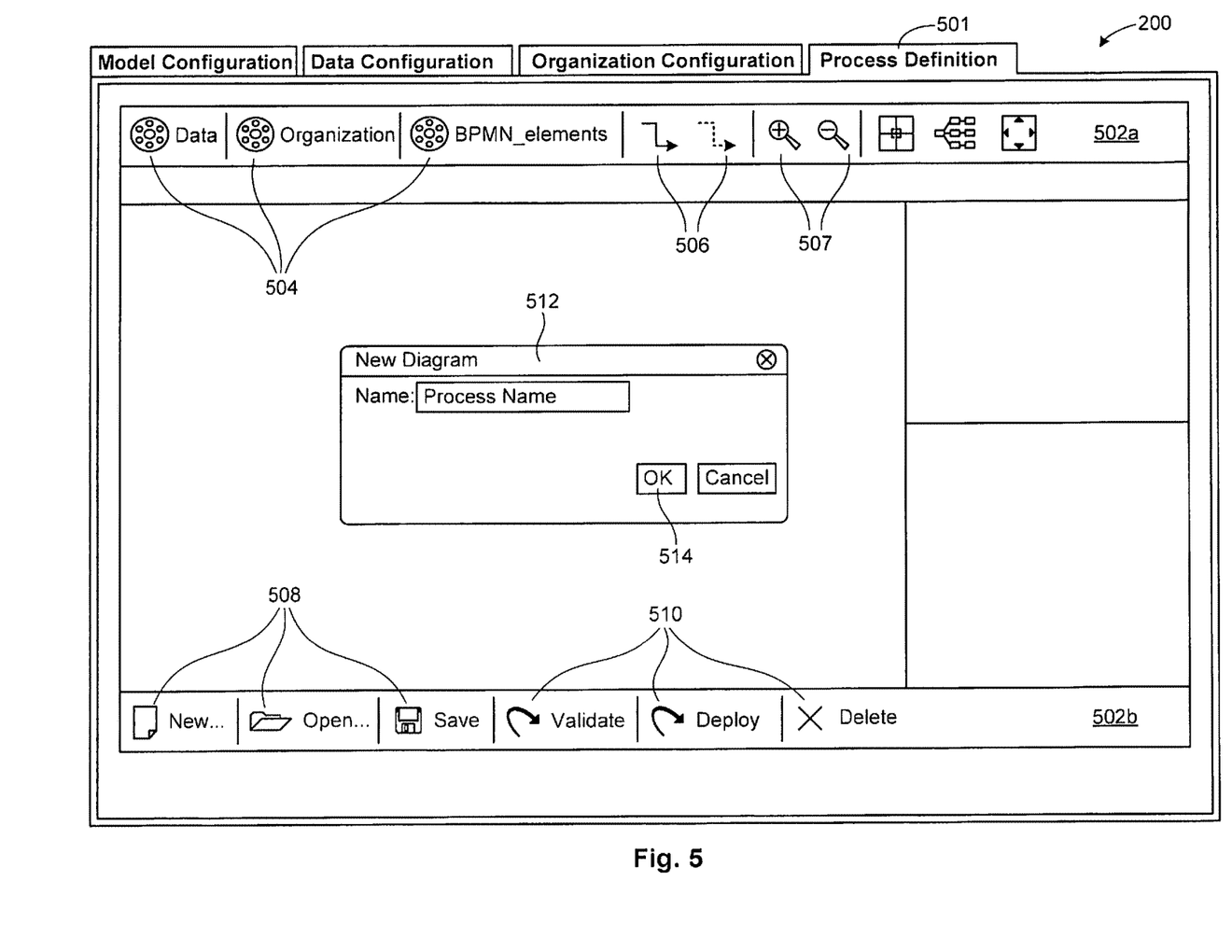
FIG. 5 shows one method for creating a new diagram in the graphical user interface.

Referring to FIG. 5, once palette elements 108 are created for the model elements 206, data elements 306, and organization elements 406, a "process definition" tab 501 and associated window may be used to create a diagram from the palette elements 108. In certain embodiments, the process definition window 501 may include various toolbars 502a, 502b to aid in creating the diagram. For example, a toolbar 502a may include buttons 504 to display palettes 114 containing the palette elements 108 created in the windows of FIGS. 2 through 4 (the names and number of these palettes 114 may be configured by the user). The toolbar 502a may also include buttons 506 to generate connectors for connecting the palette elements 108 together. Other buttons 507 may be provided to zoom in and out relative to the diagram and perform other tasks. In selected embodiments, a toolbar 502b may include buttons 508 to create a new diagram, open an existing diagram, or save a diagram. Other buttons 510 may be provided to validate the domain model instance associated with the diagram against a meta model schema 104, deploy the domain model instance, or delete a domain model instance or various elements from the model.

Figure 6:
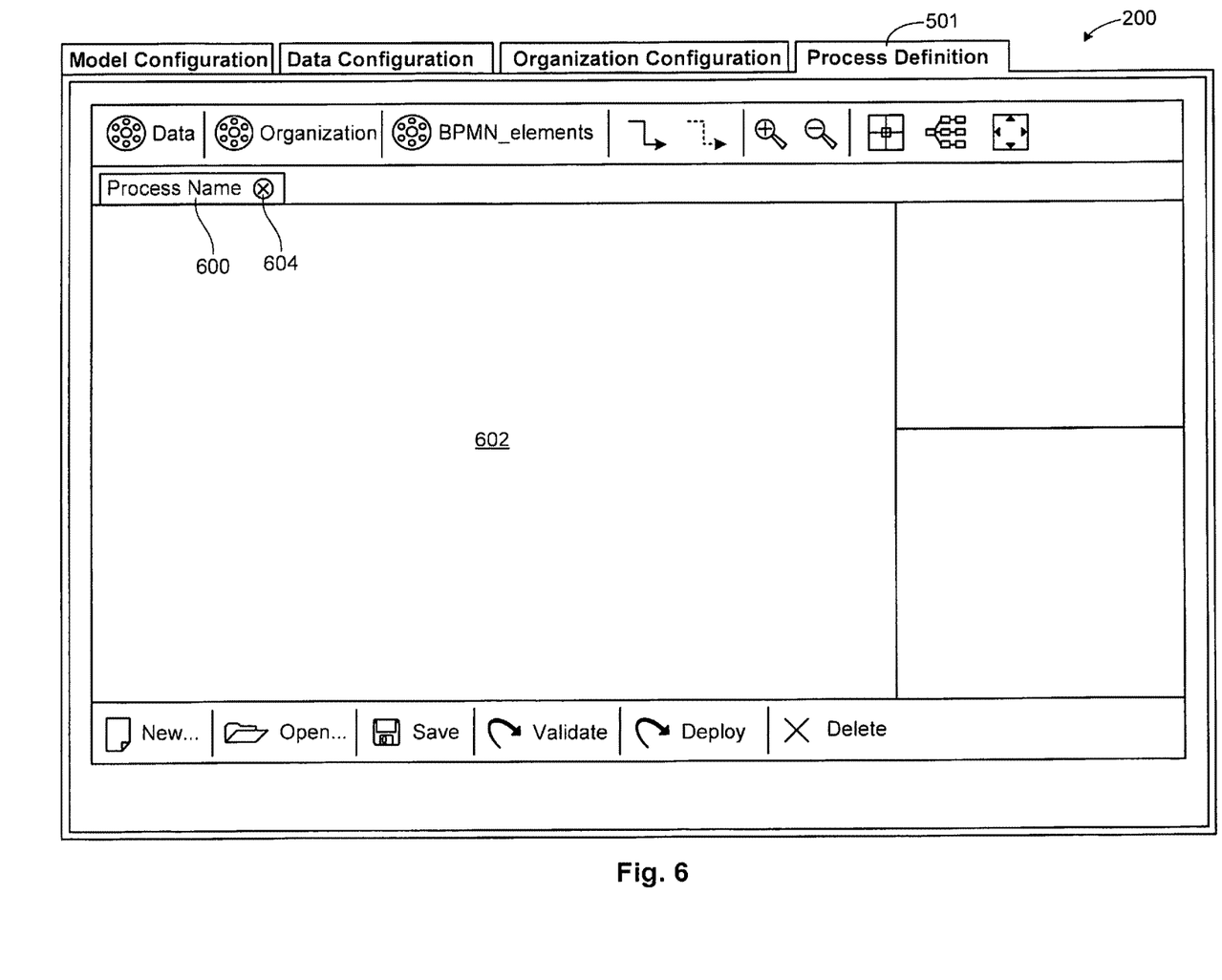
FIG. 6 shows one example of a canvas for creating a diagram in the graphical user interface.

A new diagram may be created by clicking on the "new" button 508, typing the name of the diagram into a dialog box 512, and clicking an "OK" button 514. This may create a tab 600 and associated window containing a canvas 602, as illustrated in FIG. 6. The diagram may be drawn on this canvas 602. In selected embodiments, multiple windows 600 and canvases 602 may be open at any given time in the graphical user interface 200. The canvases 602 may contain diagrams from different domains (e.g., UML, BPMM, OWL, etc) or from the same domain. In selected embodiments, diagrams from different domain models may be drawn on the same canvas 602. A window 600 and canvas 602 may, in certain embodiments, be closed by simply clicking a close button 604.

Figure 7:
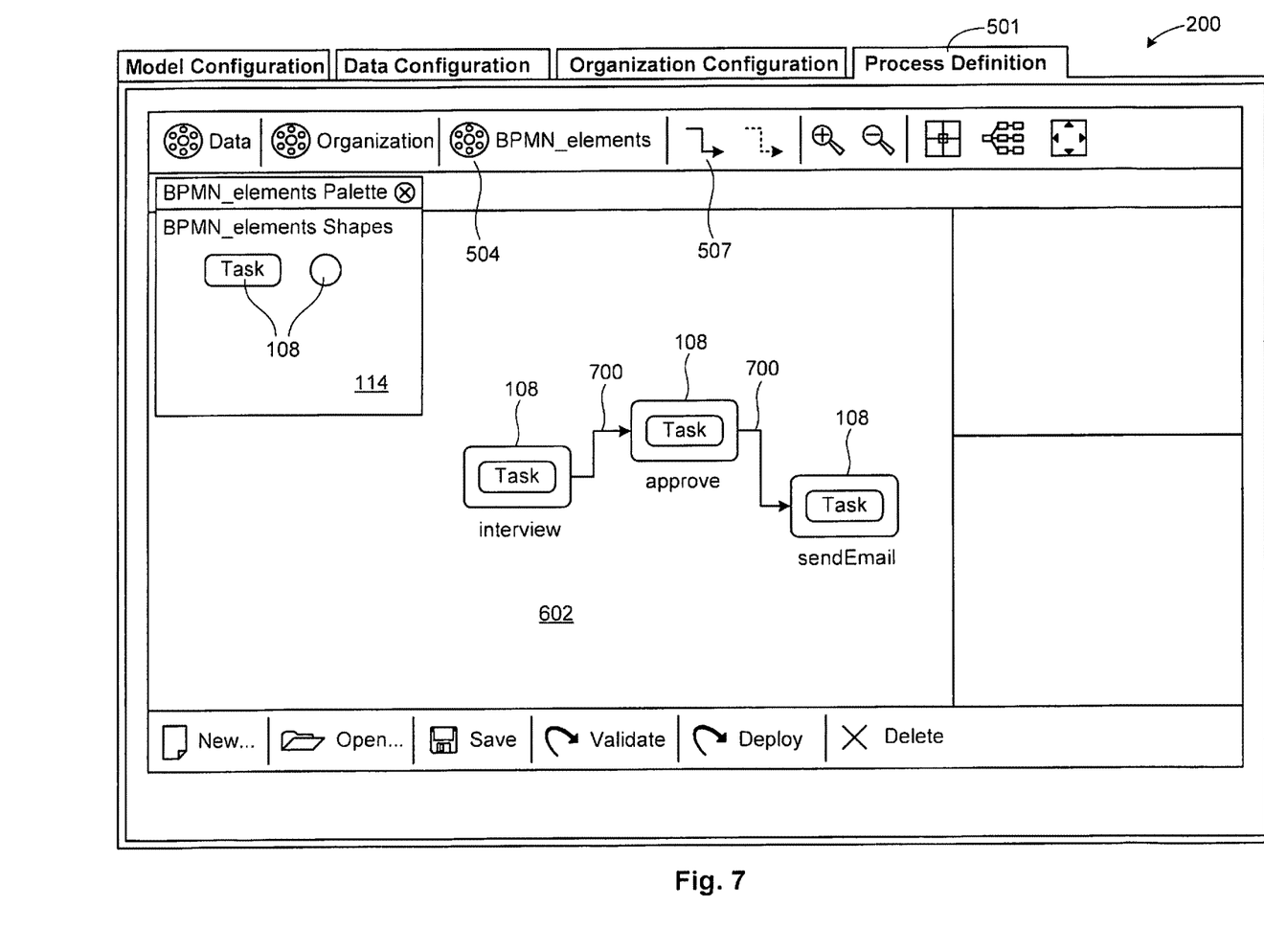
FIG. 7 shows various domain model palette elements, in this example activity palette elements, joined with connectors on the canvas.

Referring to FIG. 7, once a canvas 602 is open, a user may begin to create a diagram by assembling palette elements 108 on the canvas 602. This may be accomplished by clicking a palette button 504 to display a palette 114, and selecting the palette elements 108 contained thereon. In selected embodiments, the palette elements 108 may be dragged and dropped on the canvas 602. In this example, three "activity" palette elements 108 (as created in FIG. 2) are placed on the canvas 602 at desired locations. The user may assign names to these palette elements 108 based on the type of activity or task, such as "interview," "approve," and "sendEmail," as shown in FIG. 7. The user may then connect the palette elements 108 together with connectors 700 (to show the flow of the process and the relationship between palette elements 108) by selecting one of the connector buttons 507 and clicking and dragging the mouse from one palette element 108 to another.

Figure 8:
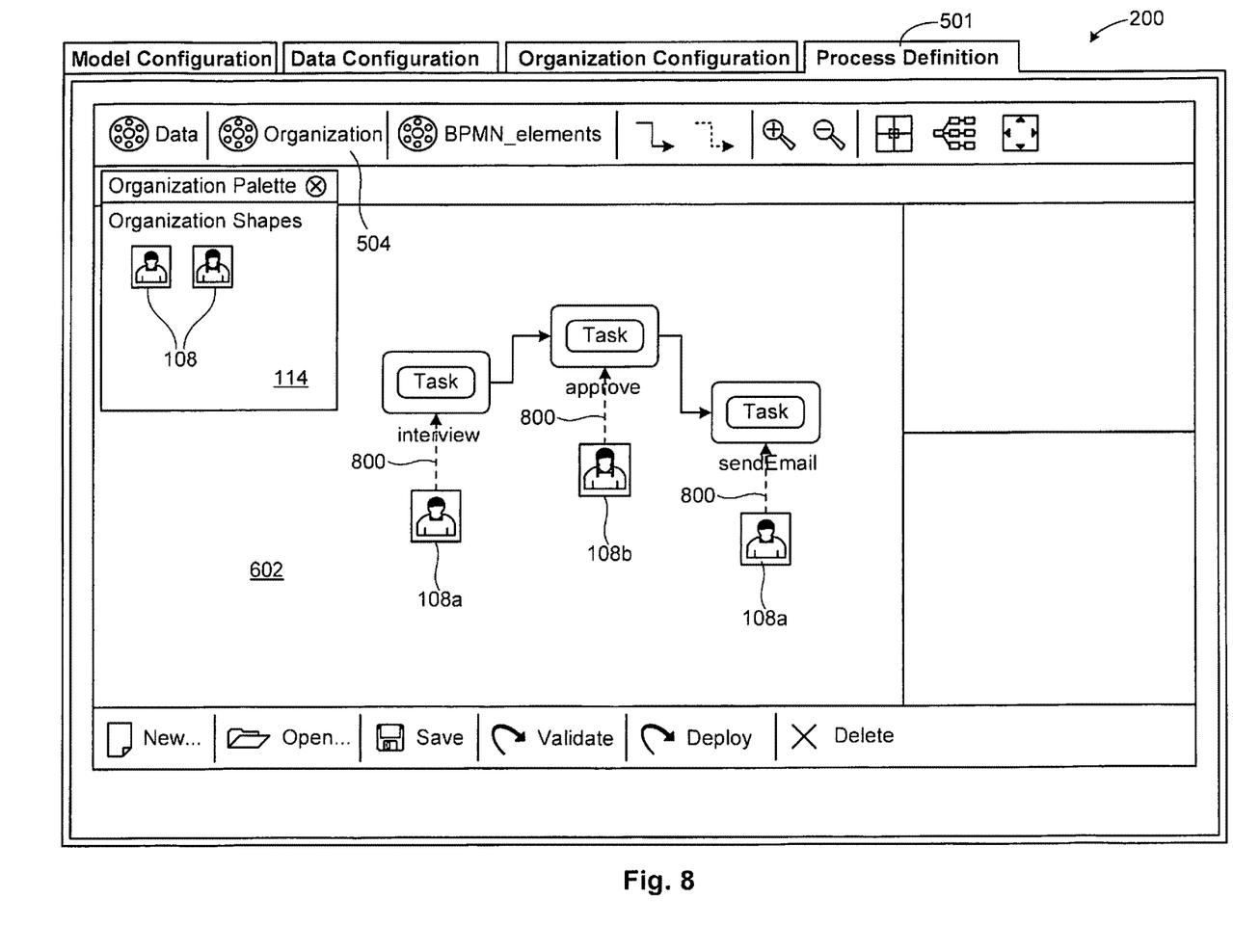
FIG. 8 shows various organizational palette elements that may be associated with the activity palette elements.

Referring to FIG. 8, the user may also be able to associate one or more persons with the illustrated activities to designate who performs each of the activities. This may be accomplished by clicking the organization palette button 504 to display the organization palette 114, and selecting palette elements 108 contained thereon. These palette elements 108 may be dragged and dropped onto the canvas 602 near the associated activities. In this example, the department head palette element 108a is placed next to the "interview" and "sendEmail" palette elements 108 and the sales manager palette element 108b is placed next to the "approve" palette element 108. The organization palette elements 108a, 108b may be associated with the activity palette elements 108 using connectors 800 as previously explained.

Figure 9:
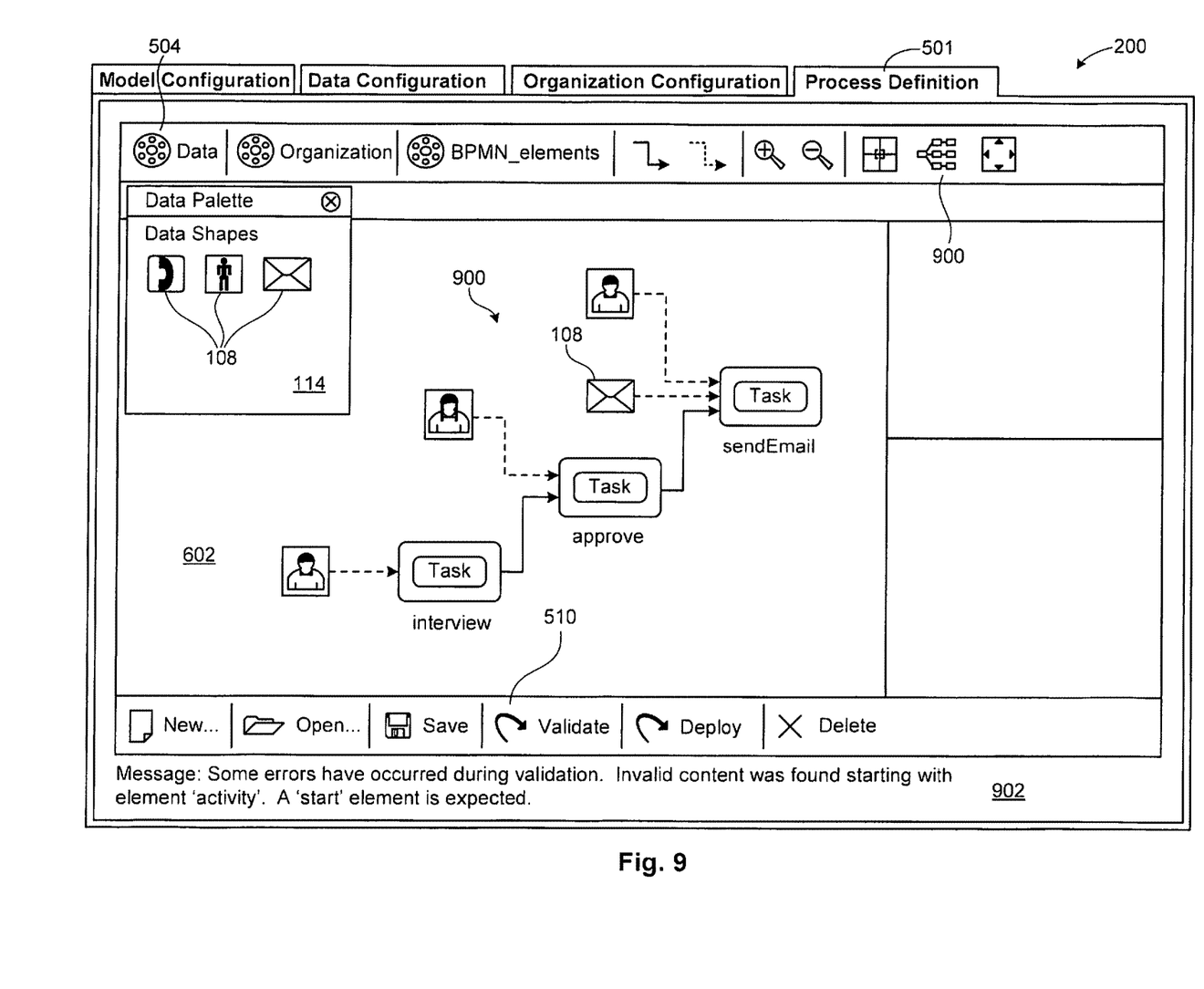
FIG. 9 shows a data palette element associated with one of the activity palette elements.
Figure 10:
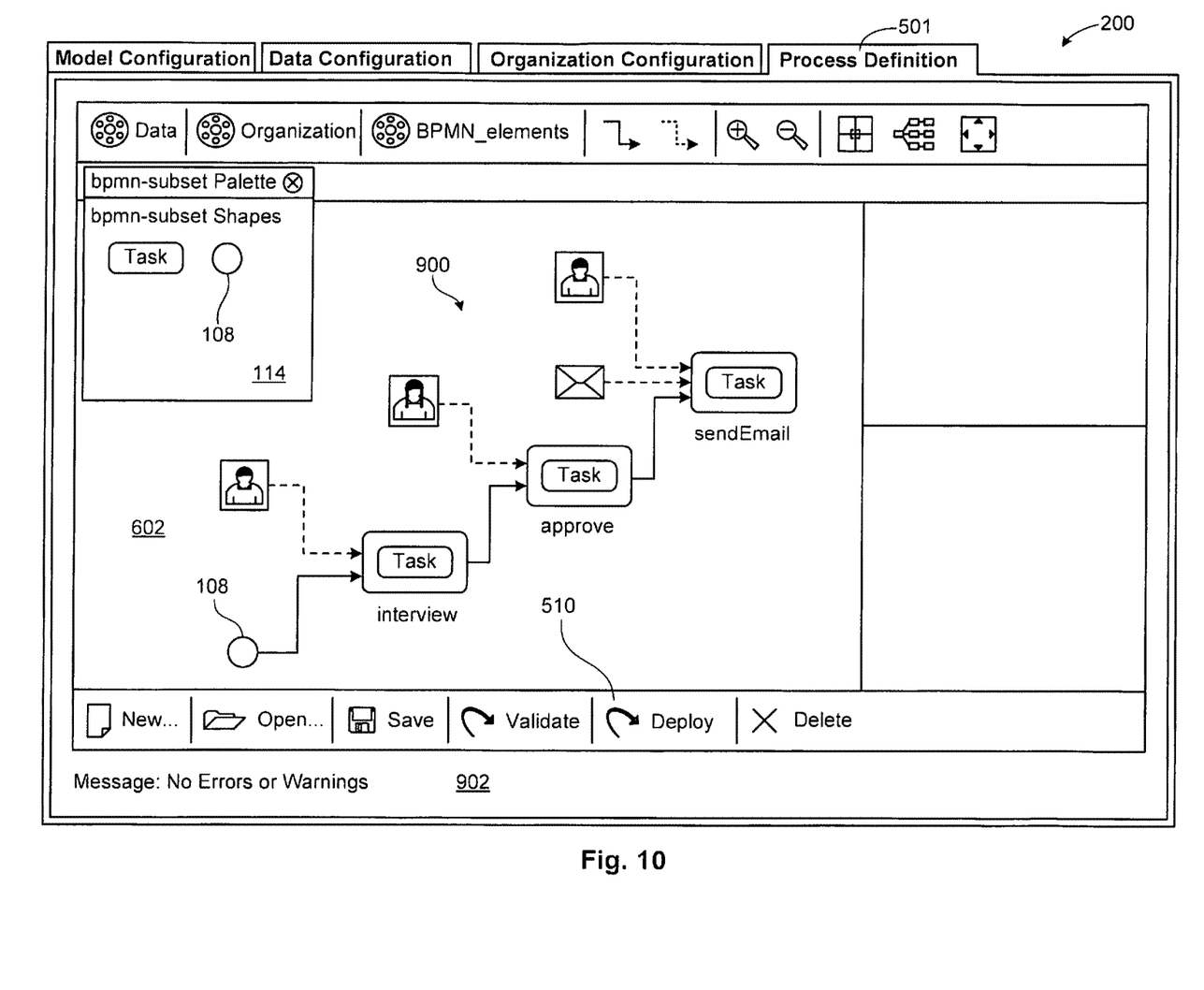
FIG. 10 shows an example of adding a start element to the diagram after a validation step has determined that the start element is missing.

Referring to FIG. 9, the user may also associate data with one or more of the illustrated activities. This may be accomplished by clicking the data palette button 504 to display the data palette 114, and selecting palette elements 108 thereon. These palette elements 108 may be dragged and dropped onto the canvas 602 in the previously described manner. In this example, the "address" data element 108 is associated with the "sendEmail" palette element 108. The data palette element 108 may be associated with the "sendEmail" palette element 108 using connectors as previously explained. Once the desired palette elements 108 are on the canvas 602, a "layout all" button 900 may be selected to distribute the palette elements 108 on the canvas 602 in an organized fashion.

One the diagram 900 is complete, a validate button 510 may be selected to validate the model instance 126 against the rules and constraints imposed by the domain meta model 104. As previously explained in association with FIG. 1, a diagram-to-model conversion module 124 may convert the diagram 900 into the underlying domain model instance 126 (which may be described in XML or another suitable language). This underlying domain model instance 126 may be validated against the domain meta model 104 to ensure that all relationships and connections in the diagram 900 are legal. If they are not all legal, the user interface 200 may display a message 902 indicating that there are errors in the diagram 900, and optionally indicate what the errors are.

For example, if the diagram 900 is missing a "start" palette element 108, the message 902 could indicate that there are errors in the diagram 900, and optionally indicate that the "start" palette element 108 is missing. The user would then be able to select a start palette element 108 from the appropriate palette 114 and insert it into the diagram 900 in the appropriate manner and location. As shown in the message bar 902 of FIG. 10, a subsequent run of the model validator would then indicate that there are no errors in the diagram 900. A deploy button 510 could then be selected to deploy the underlying domain model instance 126 associated with the diagram 900.

The flowchart and block diagrams in the Figures illustrate the architecture, functionality, and operation of possible implementations of systems, processes, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

What is claimed is:

1. A method for implementing a graphical modeling tool in a web-based environment, the method comprising:
   enabling a user to import, in a web-based modeling tool executing in memory by at least one processor of a computer, a domain meta model comprising a plurality of meta model elements;
   transforming the domain meta model into a model tree representing the plurality of meta model elements, the model tree being rendered in each of a first tab, a second tab and a third tab amongst a multiplicity of tabs of a web-based user interface of the web-based modeling tool, at least one branch of the model tree comprising nodes representing a model configuration of the domain meta model, at least one other branch of the model tree comprising nodes representing a data configuration of the domain meta model, and at least one other branch of the model tree comprising an organization configuration of the domain meta model;
   enabling the user in the first tab to select one or more meta model elements from the branch of the model tree comprising nodes representing the model configuration wherein the one or more meta model elements of the model configuration comprise one or more activity elements, separately enabling the user in the second tab to select one or more meta model elements from the at least one other branch of the model tree comprising nodes representing the data configuration wherein the one or more meta model elements of the data configuration comprise one or more data elements, and separately enabling the user in the third tab to select one or more model elements representing the organization configuration wherein the one or more meta model elements of the model tree comprise organizational elements configured to associate and designate a person to perform each of the one or more activity elements;
   enabling the user in each of the first, second and third tabs to associate, in the web-based environment, the one or more selected meta model elements organized in a tree hierarchy, with graphical representations selected by the user to create one or more desired palette elements, by providing the user with at least one of a list of graphical representations comprising notational shapes from which the user selects one of the notational shapes and a graphical user interface (GUI) widget allowing the user to upload the selected one of the notational shapes, so that when the user assembles one or more desired palette elements on a canvas, the one or more desired palette elements is rendered with the corresponding ones of the notational shapes, each desired palette element representing a mapping between a selected meta model element and a corresponding one of the notational shapes, each of the desired palette elements comprising a controller mapper declaratively specifying diagramming and domain rules associated with a corresponding one of the palette elements;
   displaying the mapping between the one or more activity elements and the corresponding ones of the notational shapes within the first tab;
   displaying the mapping between the one or more data elements and the corresponding ones of the notational shapes within the second tab;
   displaying the mapping between the organizational elements and corresponding one of the notational shapes within the third tab;
   enabling the user in a fourth tab amongst the user interface tabs of the user interface to assemble, in the web-based environment, the one or more desired palette elements on the canvas to create a diagram representative of a process definition for the domain meta model utilizing each of the model configuration, data configuration and organization configuration;
   converting the created diagram into an instance of the domain meta model; and
   validating the instance of the domain meta model for conformance with the diagramming and domain rules and constraints associated with the domain meta model the diagramming rules specifying which of the palette elements may proceed or follow others of the palette elements, the domain rules specifying how to validate the domain model elements represented by corresponding ones of the palette elements, to ensure that all relationships and connections mapped in the diagram representation are legal and where relationships are not legal, a display message is provided indicating errors within the diagram representation.

2. The method of claim 1, further comprising associating multiple desired palette elements with a palette.

3. The method of claim 2, further comprising storing at least one of the palette and desired palette elements as sharable server-side resources.

4. The method of claim 3, further comprising storing at least one of the palette and desired palette elements as RESTful, URL able web resources.

5. The method of claim 2, further comprising tagging each desired palette element in the palette to enable semantic association and searching.

6. The method of claim 2, further comprising using declarative access control to enable multiple users to simultaneously access the palette and the one or more desired palette elements over the web.

7. The method of claim 2, wherein the one or more desired palette elements and palette are declarative constructs.

8. The method of claim 1, further comprising enabling the user to create diagrams associated with multiple domain meta models on the canvas.

9. The method of claim 2, further comprising enabling the one or more desired palette elements from different domain meta models to be associated with the same palette.

10. The method of claim 1, wherein validating comprises dynamically validating the one or more desired palette elements in the context of the diagram and domain specific rules.

11. A computer program product for implementing a graphical modeling tool in a web-based environment, the computer program product comprising a non-transitory computer-usable medium having computer-usable program code embodied therein, the computer-usable program code comprising:
computer-usable program code to enable a user to import, in a web-based environment, a domain meta model comprising a plurality of meta model elements;
computer-usable program code to transform the domain meta model into a model tree representing the plurality of meta model elements, the model tree being rendered in each of a first tab, a second tab and a third tab amongst a multiplicity of tabs of a web-based user interface of the web-based modeling tool, at least one branch of the model tree comprising nodes representing a model configuration of the domain meta model, at least one other branch of the model tree comprising nodes representing a data configuration of the domain meta model, and at least one other branch of the model tree comprising an organization configuration of the domain meta model;
computer-usable program code to enable the user in the first tab to select one or more meta model elements from the branch of the model tree comprising nodes representing the model configuration wherein the one or more meta model elements of the model configuration comprise one or more activity elements, separately enabling the user in the second tab to select one or more meta model elements from the at least one other branch of the model tree comprising nodes representing the data configuration wherein the one or more meta model elements of the data configuration comprise one or more data elements, and separately enabling the user in the third tab to select one or more meta model elements from the at least one other branch of the model tree comprising nodes representing organizational elements configured to associate and designate a person to perform each of the one or more activity elements;
computer-usable program code to enable the user in each of the first, second and third tabs to associate, in the web-based environment, the one or more selected meta model elements organized in a tree hierarchy, with graphical representations selected by the user to create one or more desired palette elements, by providing the user with at least one of a list of graphical representations comprising notational shapes from which the user selects one of the notational shapes and a graphical user interface (GUI) widget allowing the user to upload the selected one of the notational shapes, so that when the user assembles one or more desired palette elements on a canvas, the one or more desired palette elements is rendered with the corresponding ones of the notational shapes, each desired palette element representing a mapping between a selected meta model element and a corresponding one of the notational shapes, each of the desired palette elements comprising a controller mapper declaratively specifying diagramming and domain rules associated with a corresponding one of the palette elements;
computer-usable program code to display the mapping between the one or more activity elements and the corresponding ones of the notational shapes within the first tab;
computer-usable program code to display the mapping between the one or more data elements and the corresponding ones of the notational shapes within the second tab;
computer-usable program code to display the mapping between organizational elements and corresponding one of the notational shapes within the third tab;
computer-usable program code to enable the user in a fourth tab amongst the user interface tabs of the user interface to assemble, in the web-based environment, the one or more desired palette elements on the canvas to create a diagram representative of a process definition for the domain meta model utilizing each of the model configuration, data configuration and organization configuration;
computer-usable program code to convert the created diagram into an instance of the domain meta model; and
computer-usable program code to validate the instance of the domain meta model for conformance with the diagramming and domain rules and constraints associated with the domain meta model the diagramming rules specifying which of the palette elements may proceed or follow others of the palette elements, the domain rules specifying how to validate the domain model elements represented by corresponding ones of the palette elements, to ensure that all relationships and connections mapped in the diagram representation are legal and where relationships are not legal a display message is provided indicating errors within the diagram representation.

12. The computer program product of claim 11, further comprising computer-usable program code to associate multiple desired palette elements with a palette.

13. The computer program product of claim 12, further comprising computer-usable program code to store at least one of the palette and desired palette elements as RESTful web resources.

14. The computer program product of claim 11, further comprising computer-usable program code to dynamically validate the one or more desired palette elements in the context of the diagram and domain specific rules.

* * * * *